(12) United States Patent
Mizuno et al.

(10) Patent No.: US 6,499,710 B1
(45) Date of Patent: Dec. 31, 2002

(54) OPENING AND CLOSING HOOK

(75) Inventors: Hiromichi Mizuno, Aichi (JP); Katsuhisa Kato, Aichi (JP); Akihiro Kamijou, Yokosuka (JP)

(73) Assignees: Aoyama Seisakusho Co., Ltd., Nagoya (JP); Kanto Jidosha Kogyo Kabushiki Kaisha, Yokosuka (JP)

( * ) Notice: Subject to any disclaimer, the term of this patent is extended or adjusted under 35 U.S.C. 154(b) by 31 days.

(21) Appl. No.: 09/762,470

(22) PCT Filed: Jun. 1, 2000

(86) PCT No.: PCT/JP00/03530

§ 371 (c)(1), (2), (4) Date: Feb. 6, 2001

(87) PCT Pub. No.: WO00/74970

PCT Pub. Date: Dec. 14, 2000

(30) Foreign Application Priority Data

Jun. 7, 1999 (JP) ............................. 11-159381

(51) Int. Cl.[7] .......................... F16B 45/00; A47H 1/00; B42F 13/00
(52) U.S. Cl. ................. 248/308; 248/322; 248/339
(58) Field of Search ................ 248/914, 308, 248/303, 322, 339, 692, 231.9, 231.91; 411/372.5, 372.6, 373, 377, 431

(56) References Cited

U.S. PATENT DOCUMENTS

| | | | | |
|---|---|---|---|---|
| 1,295,866 A | * | 3/1919 | Dodds | 411/372.6 |
| 2,923,508 A | * | 2/1960 | Daugherty | 248/58 |
| 3,860,210 A | * | 1/1975 | Berardinelli | 248/308 |
| 4,118,001 A | * | 10/1978 | Serkez | 248/308 |
| 4,312,455 A | * | 1/1982 | Weber | 248/205 |
| 4,502,256 A | * | 3/1985 | Hahn | 52/63 |
| 4,953,495 A | * | 9/1990 | Salisbury | 118/70 |
| 5,485,930 A | * | 1/1996 | Rushing | 211/59.1 |

FOREIGN PATENT DOCUMENTS

| | | |
|---|---|---|
| JP | 4-35946 | 3/1992 |
| JP | 08-282385 | 10/1996 |
| JP | 09-000415 | 1/1997 |
| JP | 10-085116 | 4/1998 |

* cited by examiner

Primary Examiner—Leslie A. Braun
Assistant Examiner—Amy J. Sterling
(74) Attorney, Agent, or Firm—Frishauf, Holtz, Goodman & Chick, P.C.

(57) ABSTRACT

A switching type hook is provided whose hook base can be made small-sized without degrading strength and durability. A stopper portion formed at an inner side of a lower end of a hook member is caused to contact directly with a side surface of a head of a bolt for fixing of the hook base so that a load applied to the hook member is born.

8 Claims, 3 Drawing Sheets

OPENING AND CLOSING HOOK

CROSS REFERENCE TO RELATED APPLICATION

This application is a U.S. National Phase Application under 35 USC 371 of International Application PCT/JP00/03530 (not published in English) filed Jun. 1, 2000.

TECHNICAL FIELD

The invention relates to an improvement in a switching type hook, which is mounted on a wall surface in an automobile room or the like and ox which a jacket, a shopping bag or the like is hung.

BACKGROUND ART

Conventional switching (opening and closing) type hooks are constructed such that a hook member 3 made of a resin is pivotally mounted to a lower end of a hook base 1 made of a resin by a pin 2. With such switching type hooks, when in non-use, the hook member 3 is turned to be received in the hook base 1 such that their facing side surfaces come close to each other, and when in use, the hook member 3 is turned to a horizontal position to be drawn out (see FIG. 5).

Such conventional switching type hooks are constructed such that when the hook member 3 is drawn out to a horizontal position, a stopper portion 4 formed at a lower end of the hook member 3 is caused to abut against an underside of the hook base 1 so that a load applied to the hook member 3 is born.

In this manner, conventional switching type hooks involve a problem that since resin materials themselves are caused to contact with each other to thereby bear a load applied to the hook member 3, there is a need of ensuring a considerably large contact space (contact between the hook base 1 and the stopper portion 4 of the hook member 3) on the hook base 1 whereby the hook base 1 is made large in external size.

DISCLOSURE OF THE INVENTION

The present invention has been contemplated to solve the above-mentioned problem of the prior art and provide a switching type hook capable of making a hook base small-sized while meeting the requirements of a predetermined strength and durability.

The invention provides a switching type hook, in which a lower end of a hook member made of a resin is pivotally mounted to a lower end of a hook base made of a resin by a horizontal pin so that the hook member is made turnable, characterized in that a bolt for fixing of the hook base has its head projecting above and near the horizontal pin so that when the hook member is drawn out to a horizontal position, a stopper portion formed on an inner side of a lower end of the hook member is caused to contact with a side surface of the head of the bolt.

In addition, the head of the bolt can be tapered.

With the switching type hook according to the present invention, when the hook member is drawn out to a horizontal position, the stopper portion formed at the inner side of the lower end of the hook member is caused to contact directly with the side surface of the head of the bolt for fixing of the hook base to bear a load, so that there is no need of providing a large contact space on the hook base. Accordingly, the hook base can be made small-sized without degrading strength and durability.

BEST MODE FOR CARRYING OUT THE INVENTION

Figure 1:
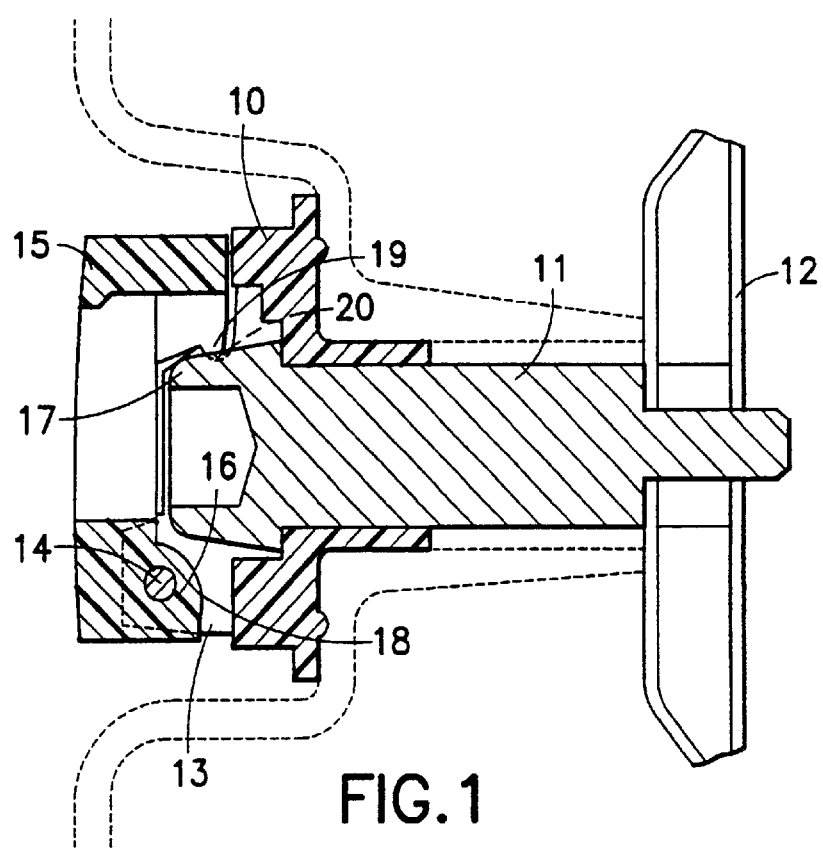
FIG. 1 is a cross sectional view showing a switching type hook according to the present invention in non-use (a hook member is turned so that a side of the hook member comes close to a facing side of a hook base, and the hook member is received in the hook base) taken along line 1—1 in FIG. 3.
Figure 3:
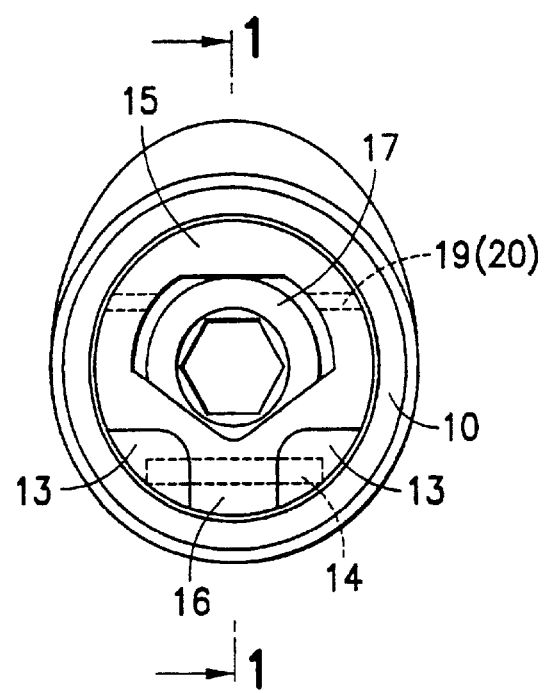
FIG. 3 is a left side view showing the switching type hook according to the present invention in non-use.
Figure 2:
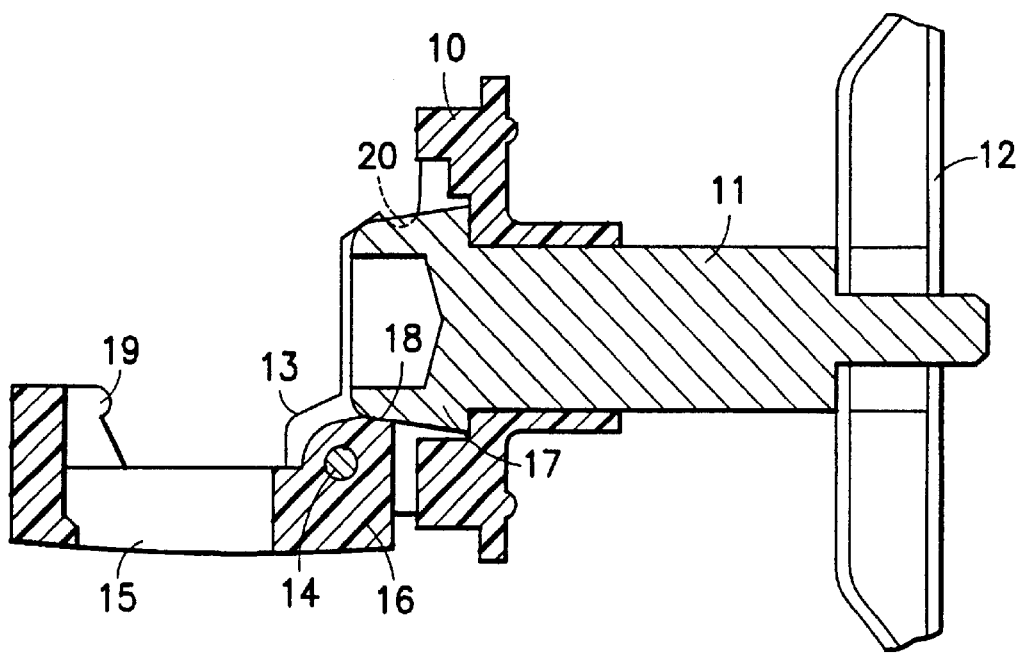
FIG. 2 is a cross sectional view showing the switching type hook according to the present invention in use (the hook member is drawn out horizontally) taken along line 2—2 in FIG. 4.
Figure 4:
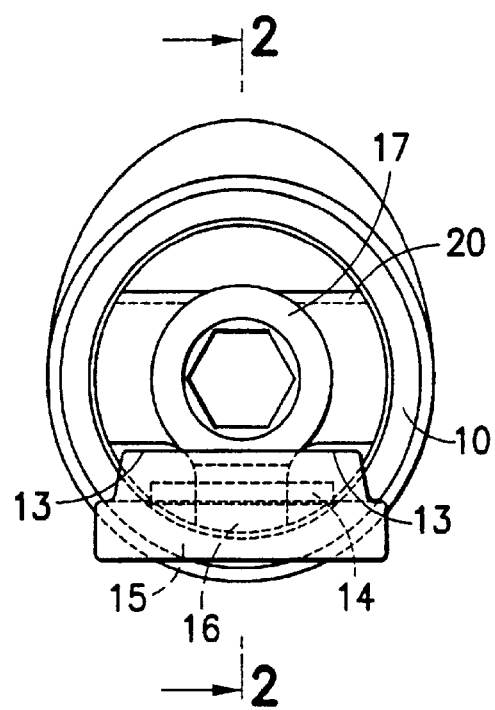
FIG. 4 is a left side view showing the switching type hook according to the invention in use.
Figure 5:
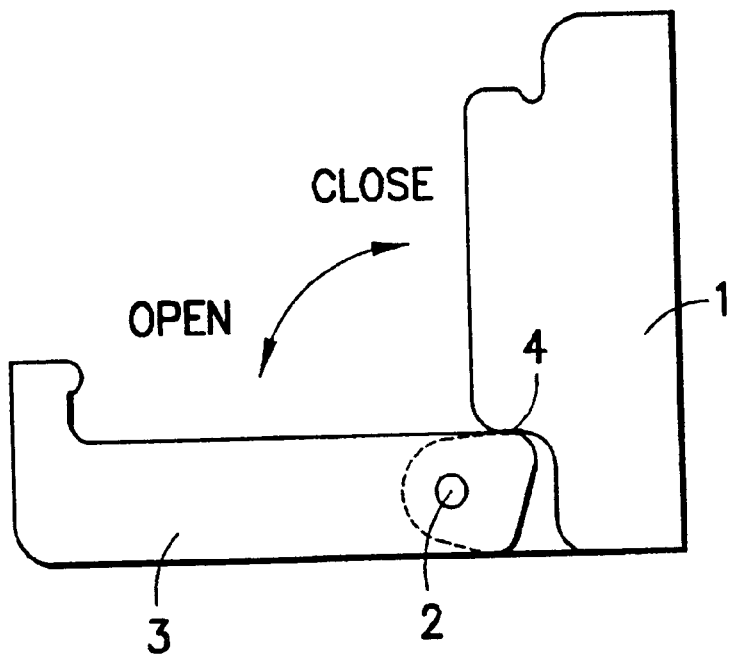
FIG. 5 is a cross sectional view showing a prior hook in use.

The invention will be described hereinbelow in details with reference to the drawings (FIGS. 1 to 4), in which an embodiment of the present invention is shown.

In the drawings, the reference numeral 10 designates a hook base made of a resin for example, polyamide such as Nylon 6, Nylon 66 or the like, polybutylene terephthalate, polycarbonate, polyacetal or the like. Incidentally, a fiberglass may further be contained in the resin. The content of the fiberglass preferably is not more than 50 wt %, more preferably 20 to 50 wt %.

The hook base 10 is substantially circular in shape (see FIG. 3), and is fixed to a mount base 12 in a vehicle by means of a bolt 11, which is made of a metal (for example, iron, aluminum, alloyed steel or the like) and extends substantially centrally through the hook base.

Forwardly extending projections 13, 13 are formed on both sides of a lower half of the hook base 10, and a horizontal pin 14 bridges between the projections. Also, the reference numeral 15 designates a substantially doughnut-shaped hook member, which is made of a resin, for example, polyamide such as Nylon 6, Nylon 66 or the like, polybutylene terephthalate, polycarbonate, polyacetal or the like (A fiberglass may further be contained in the resin. The content of the fiberglass preferably is not more than 50 wt %, more preferably 20 to 50 wt %.), and of which a lower portion 16 is fitted between the projections 13, 13 to be pivotally mounted to a lower end of the hook base 10 by having the horizontal pin 14 extending therethrough. Accordingly, the hook member 15 can be displaced about the horizontal pin 14 between a vertical position (see FIG. 1) and a horizontal position (see FIG. 2).

Unlike conventional switching type hooks, the bolt 11 has its head 17 projecting above and near the horizontal pin 14 (in the embodiment shown, the head 17 of the bolt 11 is tapered at its side surface).

When the hook member 15 is turned leftward about the horizontal pin 14 from a position shown in FIG. 1 to a horizontal position, a convex-shaped stopper portion 18 formed at an inner side of a lower end of the hook member 15 is caused to contact with the side surface of the head 17 of the metallic bolt 11 to be inhibited from turning further leftward. Differently stated, the side surface of the head 17 of the bolt 11 bears a load (weight of an article hung on the hook member 15) acting on the hook member 15 (see FIG. 2).

In addition, small projections 19 are formed on an inner surface of both sides of an upper portion of the doughnut-shaped hook member 15, so that when the hook member 15 is not used (the hook member 15 is in a state shown in FIG. 1), the projections 19 are caused to elastically fit on recesses 20 provided at an upper end of the hook base 10. As a result, the hook member 15 continues to be supported by the hook base 10 (see FIG. 1) because it cannot be turned leftward so long as the above fitting is not released intentionally.

With the switching type hook according to the present invention, when the hook member 15 is not to be used, the hook member 15 is turned rightward about the horizontal pin 14 and the projections 19 are caused to fit on the recesses 20 whereby the hook member 15 is received not to be in the way, and when the hook member 15 is to be used, the projections 19 are released from fitting on the recess 20 (concretely, a user uses a finger to pull an upper portion of the hook member 15), and it suffices to turn the hook member 15 leftward about the horizontal pin 14. When the hook member 15 is turned to a horizontal position, the convex-shaped stopper portion 18 formed at the inner side of the lower end of the hook member 15 is caused to contact with the side surface of the head 17 of the metallic bolt 11, which is markedly great in strength as compared with resins, so that the side surface of the head bears a load acting on the hook member 15.

Therefore, if an area where the stopper portion 18 of the hook member 15 contacts with the side surface of the head 17 of the metallic bolt 11 is ensured, it is unnecessary to provide a large contact area on the corresponding potion of the hook base 10 as in prior switching type hooks.

Accordingly, the hook base can be made small-sized without degrading strength and durability. Thus the switching type hook according to the present invention has an advantage that only the hook member 15 can be made large in size to facilitate use while the hook is made small-sized.

INDUSTRIAL APPLICABILITY

As described above, the switching type hook according to the present invention has an advantage that the hook base can be made small-sized without degrading strength and durability due to the construction, in which the stopper portion formed at the inner side of lower end of the hook member is caused to contact directly with the head (exactly its side surface) of the bolt for fixing of the hook base so that a load applied to the hook member is born.

What is claimed is:

1. A switching hook device comprising;

a hook member made of resin;

a hook base also made of resin;

a horizontal pin pivotally mounting the hook member to a lower end of the hook base so that the hook member is turnable; and a bolt for fixing the hook base to a surface;

wherein a head of the bolt projects through the hook base above and near the horizontal pin so that when the hook member is pivoted out to a horizontal position, a stopper portion formed on an inner side of a lower end of the hook member is caused to contact with a side surface of the head of the bolt.

2. The switching hook device according to claim 1, wherein a side surface of the bead of the bolt is tapered.

3. The switching hook device according to claim 1, wherein the hook member is substantially doughnut shaped with an opening therein and comprises small projections formed on an inner surface of both sides of an upper portion of the hook member, and wherein the small projections are adapted to elastically fit in recesses provided at an upper end of the hook base.

4. The switching hook device according to claim 1, wherein the hook member and hook base are made of a polyamide and the bolt is made of a metal.

5. The switching hook device according to claim 4, wherein the polyamide contains fiberglass in an amount of not more than 50 wt %.

6. The switching hook device according to claim 2, wherein the hook member is substantially doughnut shaped with an opening therein and comprises small projections formed on an inner surface of both sides of an upper portion of the hook member, and wherein the small projections are adapted to elastically fit in recesses provided at an upper end of the hook base.

7. The switching hook device according to claim 2, wherein the hook member and hook base are made of a polyamide and the bolt is made of a metal.

8. The switching hook device according to claim 3, wherein the hook member and hook base are made of a polyamide and the bolt is made of a metal.

* * * * *